United States Patent Office 2,756,625
Patented July 31, 1956

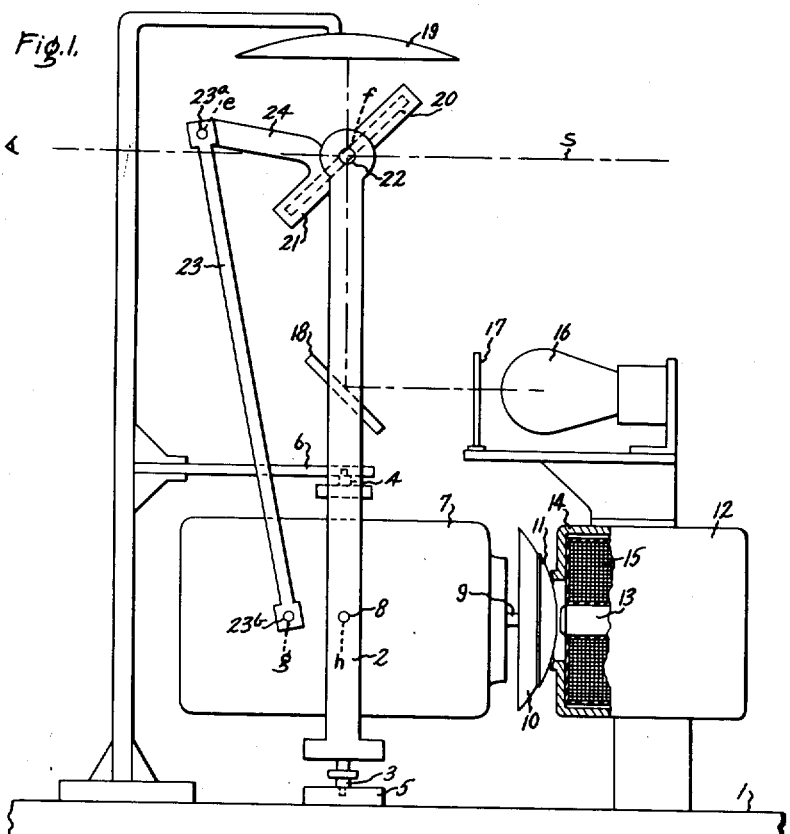

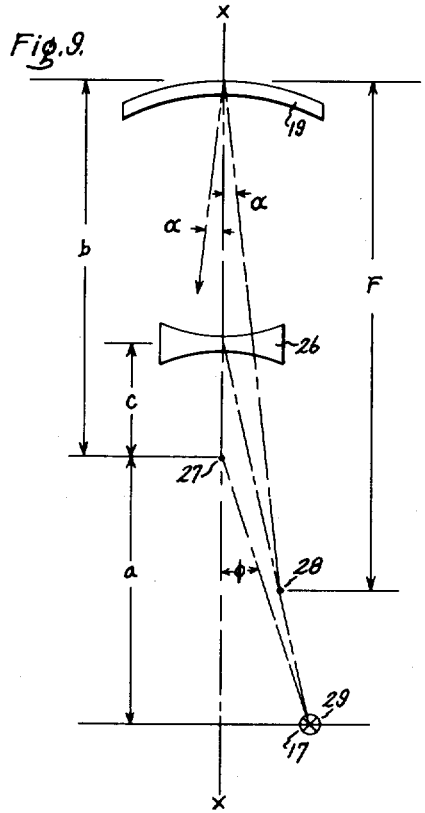
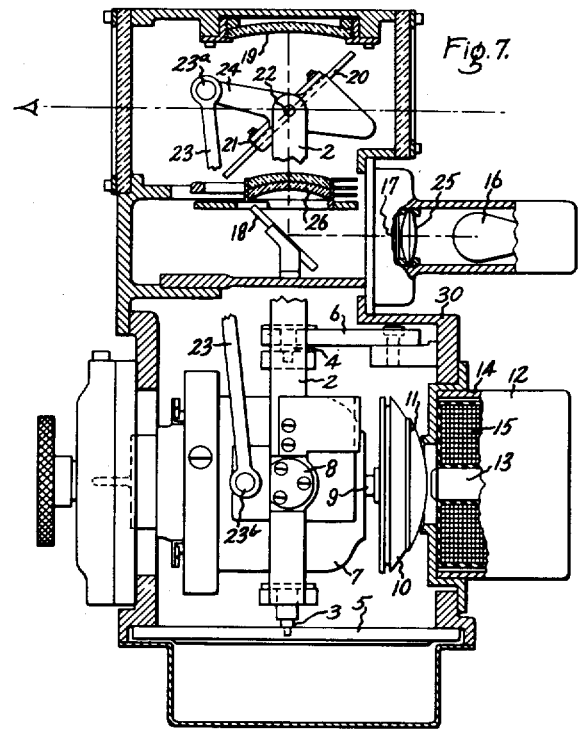
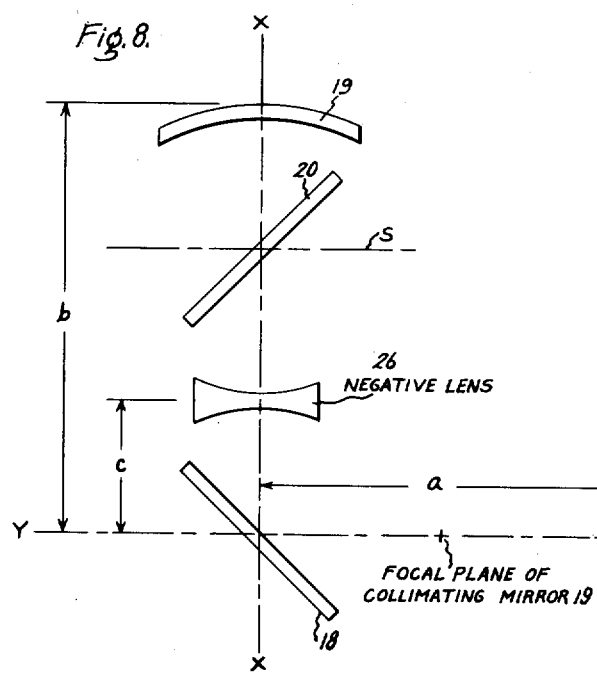
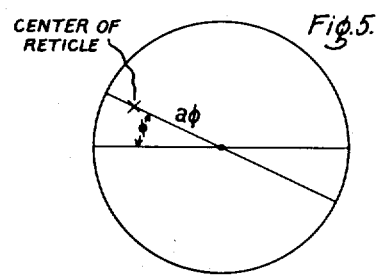
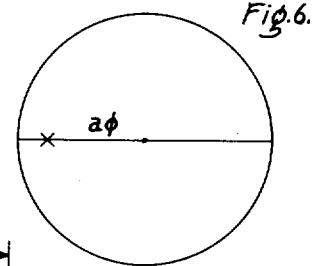
Inventor:
Frithiof V. Johnson
by Claude H. Mott
His Attorney

2,756,625

GUN SIGHTING MECHANISM HAVING GYROSCOPICALLY CONTROLLED TRANSPARENT MIRROR

Frithiof V. Johnson, Scotia, N. Y., assignor to General Electric Company, a corporation of New York Application May 4, 1949, Serial No. 91,264

10 Claims. (Cl. 88—1)

This invention relates to sighting mechanisms, more particularly to gun sighting mechanisms of the type having a gyroscopically controlled transparent mirror, and it has for an object the provision of an improved mechanism of this character.

The invention relates to improvements in the general type of sighting mechanism disclosed in my copending applications, Serial No. 464,453, filed November 4, 1942, now Patent 2,550,482, and Serial No. 532,607, filed April 25, 1944, which applications are assigned to the assignee of the present invention.

Those applications described sighting mechanisms having a transparent reflector through which the target is observed; and an optical system including a reticle and optical means for generating a luminous image of the reticle and for projecting this image onto the reflector. The reflector, in turn, reflects the luminous image into the field of view of the observer and thereby generates or determines the line of sight. The reflector and optical system are mounted on the gun and move in azimuth and elevation as the gun moves in azimuth and elevation so that the gun itself is used to control the direction of the line of sight and cause it to track the target.

Also mounted upon the gun is a gyroscope which is free to move about a point of suspension. The gyroscope is connected to the reflector so that the spin axis of the gyroscope is parallel to the line of sight when the gun is at rest, and further so that the position of the reflector relative to the gun is controlled by the gyroscope as it moves relatively to the gun.

The gyroscope is coupled so that it may be moved relatively to the gun but the coupling means is constructed and arranged to apply a torque to the gyroscope which is proportional to the magnitude of the displacement between the gyroscope and the gun, which torque tends to precess the gyroscope to bring its spin axis into a predetermined position with reference to the gun. When the gun is moving, in order to cause the line of sight to follow a target, the gyroscope is displaced from this predetermined relative position by an amount which is dependent upon the speed of the target and also upon the strength of the coupling means between the gyroscope and the gun. The coupling effect between the gyroscope and the gun is adjusted to give the gun the correct lead angle with reference to the line of sight, as is made necessary by the speed of the target.

In certain fire control applications, particularly those in which the gun is mounted upon a swaying platform, such as on shipboard or on aircraft, the system disclosed in the former application, Serial No. 464,453, has the following disadvantage: the spin axis and the line of sight are always in parallelism, therefore, if the gunner inadvertently moves the gun abruptly or if the gun mount dips or shifts its position suddenly so that the position of the gun is jerked from its correct position, the gyroscope momentarily will remain fixed and, hence, the reticle image in the field of view also will remain fixed; that is, following an abrupt change in gun position it requires a definite length of time to change the position of the reticle image. Therefore, there is nothing to give the gunner an immediate indication of the error in his gun position. Stating it differently, an error in gun position merely increases the speed of the gyroscope and reticle image and, therefore, a finite time interval must elapse before such an error is shown.

In the latter application, Serial No. 532,607, I disclose an apparatus arranged so that any motion of the gun which changes the angle between the gun and the gyroscope changes the position of the line of sight by a predetermined fraction of the amount of such angular change irrespective of the fact that the gyroscope momentarily remains fixed in position. I accomplish this by arranging the apparatus so that a ratio, other than 1:1, relates the motion of the gyroscope to that of the line of sight; that is, they are no longer in parallelism when the lead angle has any value other than zero. More specifically, this apparatus is so arranged that when the gun moves relatively to the gyroscope through the angle $\theta$ in any plane, the line of sight moves through the angle $K\theta$ in the same plane, where $K$ is any suitable value less than one. By reason of this arrangement, if the position of the gun be changed abruptly from its correct position, as ahead, the gyroscope momentarily will remain stationary, but the line of sight will be moved suddenly ahead through a predetermined fraction of the magnitude of the angle of error in the position of the gun, and thereby immediately give a visual indication that the gun position is erroneous.

In the apparatus of the latter application, I provide the desired relative motion between the gyroscope and line of sight in elevation by means of a mechanical linkage between the gyroscope and the transparent reflector through which the observer views the target. In azimuth, the desired relation is provided by locating the axis of the optical system which generates the line of sight at an acute angle with respect to the axis of the gimbal ring which supports the gyroscope. This arrangement, however, requires a relatively long collimator tube adjacent the transparent reflector which increases the size of the gun sight and interferes with visibility around this part of the sight. Furthermore, it is necessary in this apparatus to provide means in the form of an electromagnetic coupling between the gimbal ring and the gun to correct for errors in the elevation position of the line of sight at relatively large azimuth angles.

It is an object of the present invention to provide a sighting mechanism of smaller physical size having an exit pupil of equal size to that of the sight disclosed in application Serial No. 532,607. Or, stating it in another manner, the object is to provide a sight of equal physical size having a larger exit pupil.

Another object of the invention is the provision of a sight having improved visibility around the portion through which the observer views the target by eliminating the collimator tube.

A still further object of the invention is to provide a sight having smaller geometric errors at very large azimuth lead angles without the use of the electromagnetic coupling device which is used in the apparatus of application Serial No. 532,607.

For a more complete understanding of this invention, reference should be had to the accompanying drawing in which Fig. 1 is a schematic view of one embodiment of the invention; Figs. 2, 3, 4, 5 and 6 are diagrams to demonstrate the operation of the apparatus of Fig. 1; Fig. 7 is an elevation view in section of a preferred embodiment of the invention; while Figs. 8 and 9 are diagrams to demonstrate the operation of the apparatus of Fig. 7.

Referring to Fig. 1 of the drawing, there is shown a sighting device for use in controlling an automatic gun which is represented by the numeral 1. The sighting mechanism comprises a gimbal ring 2 pivotally supported by shafts 3 and 4. The shaft 3 is journaled in a support 5 which is affixed to gun 1, while shaft 4 is journaled in a support 6 which is also affixed to the gun. Pivoted on the gimbal ring 2 to move about an axis at right angles to the suspension axis of the gimbal ring is a gyroscope 7. The gyroscope is provided with shafts 8 (only one of which is shown in this figure) which are journaled in gimbal ring, or frame 2 to provide for the movement of the gyroscope.

The gyroscope 7 is provided with a gyroscope wheel shaft 9 which is driven by any suitable means (not shown) such as an induction motor. It will be understood that the axis of shaft 9 constitutes the spin axis of the gyroscope. The shaft 9, as shown, projects from the gyroscope casing and on its projecting end it carries an eddy-current disc 10. Spun over the outer curved surface of member 10 is an electrically conducting sheet 11 which is preferably made of a copper alloy.

Positioned adjacent eddy-current disc 10 is an electromagnetic device 12 which is firmly mounted on the gun 1. As described in the aforementioned applications, the electromagnet 12 has a central pole 13 and an outer annular pole 14 with a magnet energizing coil 15 positioned between the two poles. The device 12 is mounted on the gun so that the longitudinal axis of the center pole piece 13 passes through the center of suspension of the gyroscope; and the lengths and shapes of poles 13 and 14 are such that these ends lie on a spherical surface having a center at the center of suspension of the gyroscope. Also, electromagnetic device 12 is mounted so that its axis is parallel to the bore of gun 1.

The eddy-current disc 10 and the electromagnetic device 12 constitute a coupling between the gyroscope 7 and the gun 1, the eddy-current disc forming one coupling element mounted on the gyroscope, and device 12 forming the second coupling element fixed to the gun. This coupling applies to the gyroscope a torque which always tends to precess the gyroscope into alignment with the axis of device 12 whenever the spin axis of the gyroscope be not in alignment with the axis of device 12. In the operation of the coupling, when the eddy-current disc 10 is rotating in a magnetic field set up by electromagnet 12 and the spin axis of the gyroscope is aligned with the axis of the electromagnet, no eddy-currents are induced in sheet 11 on the disc which tend to precess the gyroscope. However, if the axis of the electromagnet is displaced from the spin axis of the gyroscope, the motion of the disc under the magnetic poles of device 12 causes eddy-currents to flow in the copper sheet 11. A resulting electromagnet force acts on the gyroscope which tends to precess it into alignment with the axis of device 12. The magnitude of this restoring force varies directly with the angle of departure of the gyroscope and the electromagnet and with the coefficient of coupling, which is a function of the magnet excitation current in coil 15.

As has been fully described in detail in my first mentioned copending application, the gyroscope will follow the motion of electromagnet 12 irrespective of whether the electromagnet moves in the azimuth plane, in the elevation plane, or in a slant plane, which is a combination of both azimuth and elevation.

The gyroscope 7 controls the line of sight of the sighting mechanism and it is connected to an optical system which generates the line of sight in a manner such that the position of the line of sight with reference to the gun 1 is controlled by the movement of the gyroscope with reference to the gun.

The optical system, which generates the line of sight and which is controlled by the gyroscope, establishes a collimated line of sight. This optical system includes a light source, which is represented as an incandescent lamp 16 rigidly mounted on member 12 and thus fixed with respect to gun 1. Also included in the optical system is a reticle 17 which is fixed on member 12 adjacent to lamp 16. Any suitable reticle may be used and it may, for example, be formed of glass which has one side silvered, with a suitable image such as a cross or concentric circles scribed on the silver side. Another part of the optical system is a mirror or reflecting prism 18 which is mounted on an upwardly extending bifurcated portion of gimbal ring 2. Mirror 18 is mounted at an angle such that the rays of light passing through the scribed part of a reticle 17 are reflected at right angles toward a collimating reflector 19. Reflector 19 is mounted on an upwardly extending portion of support 6 which is fixed on gun 1. It will be understood that all of the light rays from any single point on the reticle, after being reflected by mirror 18, are made parallel when further reflected by collimator 19. The parallel light rays reflected from member 19 strike an inclined transparent reflector member 20, which is illustrated in the form of a plain piece of glass.

The reticle image produced by the optical system and projected onto the transparent reflector 20 is reflected by the latter along a line s, which defines the line of sight. This reflection is to the left from member 20 in Fig. 1. An observer looking from the left along the line s through member 20 see the luminous reticle image in the field of view of the target, which image appears to be at an infinite distance. An observer positioned at the left may look through the transparent reflector into the field of view and observe both the reticle image and the target.

The glass reflector 20 is mounted in a frame 21 which, in turn, is pivoted by means of a pair of shafts 22 (only one of which is shown in Fig. 1) journaled on the upper bifurcated portion of gimbal ring 2. It will be observed, therefore, that the reflector or sight glass 20 is rotated with gimbal 2 when the gyroscope moves the gimbal relative to the gun 1. The reflector frame 21 is also connected with the gyroscope by means of a link 23 which, at its upper end, is pivoted at 23a to an arm 24 formed rigidly with the frame 21. At its lower end, link 23 is pivoted to the gyroscope at a point 23b offset from the axis of movement of the gyroscope on its shafts 8. The pivot 23a is located a distance e—f from the axis of movement of the reflector, while pivot 23b is located a distance g—h from the axis of movement of the gyroscope. The gyroscope, therefore, pivots the transparent reflector about shafts 22 as the gyroscope pivots about shafts 8.

In view of the foregoing, it will be observed that any motion of the gyroscope relative to the gun 1 will impart a movement to the reflector 20, either about the axis of movement of the frame 2 or about the axis through the shafts 22, so as to displace the line of sight s with reference to the axis of electromagnet 12 and, hence, with respect to the gun bore. As mentioned previously, the sighting mechanism is mounted on the automatic gun 1 so that the axis of electromagnet 12 is parallel with the bore of the gun. The gunner controls the line of sight, that is, the position of the reticle image by moving the gun in azimuth and elevation.

In the operation of the apparatus illustrated in Fig. 1, it will be understood that the gunner observes the target through the transparent reflector 20, the eye of the gunner being indicated at the left of the reflector. The gunner moves the gun in azimuth or elevation or in both azimuth and elevation, as required to keep the reticle image upon the target. As the gun 1 is moved in azimuth and elevation, the gyroscope lags behind the gun by an amount determined by the coupling coefficient between eddy-current disc 10 and electromagnet 12. The speed of the gun measures the angular velocity of the target, while the coupling coefficient is adjusted by varying the current in coil 15 in accordance with the time of flight of the projectile from the gun to the target so that the lag in the position of the line of sight is the corect lead angle for the gun, as required by the speed of the target.

The displacement of the gyroscope's spin axis with reference to the gun 1 imparts a displacement to the line of sights because of the motion imparted by the gyroscope to transparent reflector 20. Therefore, in order to keep the reticle image on the target, the position of the gun necessarily has to be advanced with reference to the line of sight, this angular advance of the gun being the correct lead, as required by the speed of the target.

In the sighting apparatus described in copending application Serial No. 464,453, the line of sight s is maintained at all times in parallel relation with the spin axis of the gyroscope. Therefore, if for any reason the position of the gun 1 be suddenly shifted from its correct position, the gyroscope and the line of sight will hold the reticle image momentarily fixed within the field of view and there is nothing to indicate to the gunner that the gun has been shifted to an improper position.

As pointed out in copending application Serial No. 532,607, in order to obviate this difficulty, I arrange the sighting mechanism so that a ratio other than 1:1 relates the motion of the gyroscope's spin axis to that of the line of sight s whereby the spin axis and the line of sight are no longer parallel when the lead angle has any value other than zero. The apparatus of the latter application is arranged so that when the gyroscope moves through the angle $\theta$ in any plane, the line of sight s moves through the angle $K\theta$ in the same plane where K is less than 1. Therefore, if the gun is moved abruptly—ahead of its correct position—by an angle $\Delta\theta$, the gyroscope momentarily remains fixed in direction, but the line of sight moves suddenly ahead through an angle $(1-K)\Delta\theta$, and, hence, shifts the reticle image in the gunner's field of view, this shift taking place concurrently with the shift in the gun's position. This gives the gunner an immediate signal that there is an error in the gun's position.

In application Serial No. 532,607, and similarly in the present invention, assuming that the apparatus is arranged so that the motion of the gyroscope's spin axis to that of the line of sight is as just described, it will be understood by reference to Figs. 2 and 3 that if the gun 1 be steadily tracking a target and the gyroscope spin axis be lagging behind that of the gun bore by the angle $\theta$ then the position of the line of sight will be located between the gyro axis and the gun bore axis. The angle between the line of sight and the gun bore axis will be $K\theta$, while the angle between the line of sight and the gyroscope axis will be $\theta - K\theta$. Now, if the gun be shifted abruptly forwardly by an angle equal to $\Delta\theta$ and the gyroscope remains momentarily fixed, then the angle existing between the gyroscope axis and the gun bore will be $\theta + \Delta\theta$ while the angle between the line of sight and the gun bore will be $K(\theta + \Delta\theta)$ therefore, the angle that now exists between the gyroscope axis and the line of sight will be $(\theta + \Delta\theta) - K(\theta + \Delta\theta)$. Hence, the change in the angular position of the line of sight due to the abrupt change in the position of the gun—the gyroscope axis remaining momentarily fixed—is:

$[(\theta+\Delta\theta)-K(\theta+\Delta\theta)]-(\theta-K\theta)$, which is $\theta+\Delta\theta-K\theta-K\Delta\theta-\theta+K\theta$, which is $\Delta\theta-K\Delta\theta$, or $\Delta\theta(1-K)$ Remembering that the value of K is always less than 1, it will be observed that any movement of the gun which results in a change in the position of the gyroscope's spin axis with respect to the gun bore will shift the line of sight in the direction of movement of the gun bore through an angle which will be a fraction of the amount of change in the angular relation between the gun bore and the gyroscope spin axis.

In elevation, the ratio K is introduced into the system by the connection means between the gyroscope 7 and the reflector 20. The ratio of the step-down linkage between the reflector 20 and the gyroscope 7 necessary to obtain this ratio is $K/2$, the latter ratio being obtained by properly proportioning the length of the distance $e$—$f$ to the length of the distance $g$—$h$ of the connection link pivots 23a and 23b. It will be observed that if the position of the gun be abruptly shifted about the elevation axis, the gimbal ring 2 will be moved with the gun, while the gyroscope 7 remains momentarily fixed and, as a result, the position of the reflector 20 necessarily will be changed. As a result, the line of sight s will be shifted in the elevation plane by an amount equal to $\Delta\theta$ (the magnitude of the angular change) times $(1-K)$.

For azimuth, or traverse movements of the gun and the line of sight, the proper ratio between the movement of the line of sight and the gyroscope is effected by positioning the optical system as shown in Fig. 1. In order to facilitate the understanding of the function of the sighting mechanism for azimuth movements of the gun, the motion of the line of sight in azimuth can be broken into two parts. Referring to Fig. 4, if an observer were located above collimator 19 and were looking downwardly through the collimator along the axis X—X into mirror 18 and the gimbal were turned clockwise through an angle $\phi$, there would be an apparent motion of the reticle, as shown in Fig. 5. If the operator moved around with the gimbal while looking into mirror 18, he would see an apparent linear motion of the reticle, as shown in Fig. 6. The apparent linear motion $a\phi$ of the reticle in Fig. 6 produces a change in the direction of the light rays coming from the collimating mirror 19 of $$\frac{a\phi}{F}$$

where F is the focal length of mirror 19 and $a+b=F$. It is assumed here that $\phi$ is small so that the sine of the angle is approximately equal to the magnitude of the angle. Thus, the operator, if moving with the gimbal, and looking horizontally into reflecting glass 20 along the line of sight s would see a change in apparent direction in the line of sight of $$\frac{a\phi}{F}$$

in the direction opposite the motion of the gimbal.

The operator, if not turning but fixed behind the sight in the normal manner, would then see a change in direction of the line of sight of $\phi$ due to the rotation of the sight glass with the gimbal which would occur if the reticle were fixed on the gimbal and, in addition, the change just described of $$\frac{a\phi}{F}$$

The net apparent rotation is $$\phi - \frac{a\phi}{F} \text{ or } \frac{\phi(F-a)}{F}$$

It is desired that this should be $$\frac{\phi}{1+\sigma}$$

where $\sigma$ is a number which is indicative of the amount by which the line of sight leads the gyroscope spin axis. From this relation, $$\sigma = \frac{a}{F-a}$$

from which it can be seen that it is possible to obtain any desired relation between the relative angular motions of the gun bore and the line of sight by adjusting the length $a$.

It can be seen that the ratio of the motion of the line of sight to the motion of the gyroscope is $$\frac{1}{1+\sigma}$$

in azimuth, the same as in elevation. $\sigma$ is a smoothing parameter which is related to K of the earlier portion of the description by the relation $$K = \frac{1}{1+\sigma}$$

In the apparatus illustrated in Figs. 1 and 4, the length $b$ must usually be made as small as possible to minimize the total height of the sight. Therefore, the length $b$ is usually made just large enough to accommodate sight glass 20 between reflectors 18 and 19. The smoothing parameter $\sigma$ is predetermined by the value which is chosen for K or, in other words, by the fraction of the angular movement of the gun bore which it is desired to impart to the line of sight. Therefore, the length $a$ and the focal length F of collimating mirror 19 are determined within narrow limits for such an apparatus.

This is satisfactory if the reticle is a pattern of fixed size. However, if a variable diameter reticle pattern is used, as for stadia range finding, for example, two difficulties arise. The reticle, in such a case, has moving parts and operating shafts and is inherently much larger physically than a fixed reticle. This makes it difficult to attain the calculated value of $a$, which is relatively small in most cases, without mechanical interference with the gyroscope and the gimbal. In addition, the minimum size of the pattern which can be obtained with a variable diameter reticle is usually such as to require a longer effective focal length of the optical collimating system than can be tolerated on a sight of this type.

These difficulties are remedied by interposing a negative lens 26 between mirror 18 and reflecting glass 20, as shown in Fig. 7. In this figure, like parts have like numerals with the corresponding parts in Fig. 1. The negative lens 26 is rigidly mounted on a casing 30 which supports the entire sighting mechanism, the casing being rigidly mounted on a gun (not shown) to turn in azimuth and elevation therewith. All parts which are shown schematically in Fig. 1 rigidly mounted on the gun are rigidly mounted on supporting casing 30 in this figure. Likewise, all parts which are shown as movable relative to the gun in Fig. 1 are movable relative to the supporting casing in Fig. 7. Lens 25 in this figure is a condensing lens which makes it possible to use a greater portion of the output of light source 16. Reticle 17 is variable in size in this preferred embodiment of the invention by means of a gear train mechanism (not shown) in order to adjust the size of the reticle to conform to the size and range of the target. By suitable combinations of focal lengths of collimating mirror 19 and negative lens 26 in this apparatus, it is possible to obtain an increased effective focal length of the optical system so that an increased value of $a$ can be used.

The arrangement of the sighting mechanism incorporating negative lens 26 is shown schematically in Fig. 8. When mirror 18 is in its normal zero position, an observer looking down into it along axis X—X sees the center of the reticle 17 appearing to lie on axis X—X at a distance $a$ below mirror 18. As the gimbal on which mirror 18 is mounted is rotated through angle $\phi$ about axis X—X, the reticle appears to swing in a plane perpendicular to the paper, as though on an arm of length $a$ swinging through angle $\phi$. This effect is the same as explained previously in connection with Figs. 5 and 6, with the angular motion of the gimbal producing an apparent linear motion of the reticle.

An equivalent diagram of the present system is shown in Fig. 9. The intersection of the axis X—X with mirror 18 is at 27. The focal plane of collimating mirror 19 passes through point 28. The apparent position of the reticle center would be at 29, if negative lens 26 were not present.

It is necessary that the negative lens 26 form a virtual image of the reticle at 28 on the focal plane of mirror 19, in order that the light output from mirror 19 be collimated. To satisfy this, $$(1) \qquad \frac{1}{F-b+c} - \frac{1}{a+c} = \frac{1}{-F_n}$$

where $F_n$ is the focal length of the negative lens.

It is also necessary that the ratio of the size of the virtual image to the focal length of the collimating mirror 19 be equal to the ratio of the actual size of the reticle to the effective focal length of the optical system. Thus, $$(2) \qquad \frac{F-b+c}{F} = \frac{a+c}{F_e}$$

where $F_e$ is the effective focal length.

The direction of the collimated light from mirror 19 may be determined by the construction illustrated in Fig. 9. The location of the center of the virtual image is first found by drawing a line from the center 29 of the real reticle to the center of negative lens 26. The center of the virtual image falls on this line at 28. The direction of the collimated light is found by drawing a line from the virtual image 28 to the center of the collimating mirror 19, forming an angle $\alpha$ with axis X—X. The reflected collimated light makes an equal and opposite angle $\alpha$ with axis X—X, as shown. By simple proportion, assuming angles $\phi$ and $\alpha$ to be small so that the sine of the angle is approximately equal to the angle $$(3) \qquad \frac{a\phi}{a+c} \cdot \frac{(F-b+c)}{F} = \alpha = (1-K)\phi$$

As in the previous apparatus, $$K = \frac{1}{1+\sigma}$$

where $\sigma$ is the predetermined smoothing parameter of the sight.

Solving for F in Equation 3 gives $$(4) \qquad F = \frac{b-c}{K-(1-K)\frac{c}{a}}$$

Substituting Equation 4 into Equation 2 gives $$(5) \qquad a = (1-K)F_e$$

Substituting Equation 4 into Equation 1 gives $$(6) \qquad F_n = -\frac{(b-c)(a+c)}{F_e-(a+b)}$$

Normally $(b-c)$ and $c$ are fixed by the size of sight glass 20 and the requirement that $b$ be made as small as possible. K is predetermined by the tactical use of the sighting mechanism, that is, whether the gun is mounted on a fixed base, on shipboard, on an aircraft, or the like. $F_e$ may be fixed or variable within certain limits. From Equation 5, $a$ may be found, then F from Equation 4 and $F_n$ from Equation 6.

In one typical apparatus embodying my invention, the following values are present:

$$b-c = 3.3 \text{ inches}$$
$$c = 1 \text{ inch}$$
$$F_e = 11.3 \text{ inches}$$
$$\sigma = .3$$
$$K = .77$$

Therefore, $$a = (.23)(11.3) = 2.6 \text{ inches}$$
$$F = \frac{3.3}{.77 - \frac{.23}{2.6}} = 4.85 \text{ inches}$$
$$F_n = \frac{(3.3)(3.6)}{11.3 - 6.9} = -2.7 \text{ inches}$$

The operation of the apparatus illustrated in Figs. 7–9 inclusive, in elevation, is the same as that illustrated in Fig. 1, the factor $\sigma$ being obtained by the linkage ratio betwen the gyroscope and reflecting glass 20.

While I have illustrated and described a preferred embodiment of my invention, modifications thereof may be made. For example, the negative lens may be omitted in the manner illustrated in Fig. 1 on the accompanying drawing, if it is desired to use a recticle of fixed size and the dimensions of the sighting mechanism permit the installation of such a reticle in the proper location without interfering with the gimbal ring or gyroscope. Therefore, it should be understood that I intend to cover, by the appended claims, all modifications which fall within the true spirit and scope of my invention.

What I claim as new and desire to secure by Letters Patent of the United States is:

1. A gun sighting mechanism comprising means for rigidly supporting said mechanism on said gun whereby said mechanism moves in azimuth and elevation with the gun as the gun moves in azimuth and elevation, a frame mounted on said gun and movable with respect to the gun on an azimuth axis, a transparent reflector movably mounted on said frame, an optical system for generating a luminous image of a reticle and for projecting it onto said reflector which reflects it to define a line of sight in the target field of view, said optical system comprising a light source and adjustable reticle means fixed on said gun, a mirror mounted on said frame and a negative lens and a collimating mirror rigidly supported on said gun, means mounting said reflector for motion on an elevation axis at right angles to said azimuth axis, a gyroscope mounted on said frame for motion on an axis parallel to said elevation axis of said reflector, a connection between said gyroscope and said reflector for moving said reflector on its elevation axis, said gyroscope controlling the direction of said line of sight both in azimuth and in elevation in accordance with the poistion of said gyroscope relative to said gun, said gun being moved to move the line of sight in the target field of view in order to track a target, and a yieldable coupling between said gyroscope and said gun for applying to said gyroscope a precessing force proportional to the magnitude of the angular displacement between the spin axis of the gyroscope and said gun so as to cause said spin axis to tend to follow the movement of said gun both in azimuth and elevation, the spin axis however angularly lagging behind said gun, the magnitude of the angular lag between said spin axis and said gun depending upon the speed of said gun and the magnitude of said force, said connection means between said gyroscope and said reflector being constructed and arranged and said optical system being constructed and arranged so that changes in the angle of departure between said gyroscope and said gun in elevation and azimuth change the position of said line of sight in elevation and azimuth respectively by a predetermined fraction of said angle of departure.

2. A gun sighting mechanism comprising means for rigidly supporting said mechanism on said gun whereby said mechanism moves in azimuth and elevation with the gun as the gun moves in azimuth and elevation, a frame mounted on said gun and movable with respect to the gun on an azimuth axis, a transparent reflector movably mounted on said frame, an optical system for generating a luminous image of a reticle and for projecting it onto said reflector which directs it as a line of sight into the target field of view, said optical system comprising a light source and a reticle fixed on said gun, a mirror mounted on said frame and a collimating mirror rigidly supported on said gun, means mounting said reflector for motion on an elevation axis at right angles to said azimuth axis, a gyroscope mounted on said frame for motion on an axis parallel to said elevation axis of said reflector, a connection between said gyroscope and said reflector for moving said reflector on its elevation axis, said gyroscope controlling the direction of said line of sight both in azimuth and in elevation in accordance with the position of said gyroscope relative to said gun, said gun being moved to move the line of sight in the target field of view in order to track a target, and a yieldable coupling between said gyroscope and said gun for applying to said gyroscope a precessing force which is proportional to the magnitude of the angular displacement between the spin axis of the gyroscope and said gun so as to cause said spin axis to tend to follow the movement of said gun both in azimuth and elevation, the spin axis however angularly lagging behind said gun, the magnitude of such angular lag depending upon the speed of said gun and the magnitude of said force, said connection means between said gyroscope and said reflector being so constructed and arranged and said optical system being so positioned that changes in the angle of departure between said gyroscope and said gun in both elevation and azimuth change the position of said line of sight in both elevation and azimuth by a predetermined fraction of said angle of departure.

3. A gun sighting mechanism comprising means for moving said mechanism with said gun as the latter moves in azimuth and elevation, a transparent sight reflector in said mechanism mounted for movement with reference to said gun in azimuth and elevation, optical means for generating an optical reticle image and for projecting it onto said reflector, said optical means comprising a source of light, a reticle, a mirror movable in azimuth with reference to said gun, and a collimating mirror, said reflector directing said image to define a line of sight, said line of sight being moved to track a target by the movement of said gun, a gyroscope in said mechanism mounted for freedom of motion about an elevation axis and connected to said reflector so that the motion of said gyroscope about its said axis is imparted to said reflector to control the motion thereof in elevation, a yieldable coupling between said gyroscope and said gun for applying a force to said gyroscope to cause it to precess to cause its spin axis to tend to follow the movement of said gun in keeping said line of sight on a target, said gyroscope spin axis however lagging behind said gun by an amount depending upon the speed of said gun and the magnitude of said force, said reticle being positioned substantially at the focus of said collimating mirror and said mirror being located so that the image of said reticle is reflected by said mirror at an angle onto said collimating mirror, the position of said mirror and said transparent sight reflector with reference to said gun being responsive to the amount of said lag in azimuth, whereby a motion of said gun which changes the amount of said lag changes the position of said line of sight by a predetermined fraction of the amount of said change in both azimuth and elevation.

4. A gun sighting mechanism comprising means for moving said mechanism in a rigid system with the gun as the gun moves in azimuth and elevation, a transparent reflector, a frame supporting said reflector for motion with the frame with reference to said gun on an azimuth axis, means mounting said reflector in said frame for motion on an elevation axis at right angles to said azimuth axis, an optical system including a reticle and means for generating a luminous image thereof and for projecting said image onto said reflector which directs it as a line of sight into the target field of view, said means comprising a mirror mounted on said frame and a negative lens and a collimating mirror supported on said gun, a gyroscope mounted on said frame for motion on an axis parallel to said elevation axis of said reflector, a connection between said gyroscope and said reflector for moving said reflector on its elevation axis, said gyroscope controlling the direction of said line of sight both in azimuth and in elevation in accordance with the position of said gyroscope relative to said gun, said mechanism being moved by said gun to move the line of sight in the target field of view in order to track a target, a yieldable coupling between said gyroscope and said gun for applying to said gyroscope a precessing force to cause it to tend to follow the movement of said gun in azimuth and elevation, the angular departure between said gyroscope and said gun depending on the speed of said gun and the magnitude of said force, and means controlling the position of said line of sight so that any motion of said gun which changes the angle between the gun position and that of said gyroscope changes the position of said line of sight in both azimuth and elevation by a predetermined fraction of the amount of change in said angle.

5. An optical gun sighting device comprising a gimbal ring having an upwardly extending bifurcated portion pivotally mounted on a gun to pivot in azimuth with respect to said gun, a transparent reflector through which a target is observed pivoted on the bifurcated portion of said gimbal on an elevation axis at right angles to said azimuth axis, a gyroscope having its spin axis parallel to the bore of said gun when said gun and said device are at rest pivotally mounted on said gimbal ring on an axis parallel to the elevation axis of said reflector, means for applying a precessing force for restoring said gyroscope to a position with the spin axis parallel to said gun bore following a displacement therefrom by a movement of said gun, a linkage joining said reflector and said gyroscope whereby pivoting said gun in elevation causes said transparent reflector member to pivot on said gimbal through an angle equal to less than half the angle through which the gyroscope pivots, and an optical system for producing a virtual image of a reticle in the field of view of an observer by reflecting an image of said reticle onto said transparent reflector member to form a line of sight, said line of sight moving through a smaller angle than the angle through which said gyroscope moves in elevation due to said linkage, said optical system comprising a reticle and a source of light for producing an image thereof mounted on said gun, and a mirror mounted on said gimbal for reflecting said image at approximately a ninety degree angle with the original direction thereof onto a collimating mirror rigidly supported on said gun, said collimating mirror reflecting said image onto said transparent reflector, the sum of the distances from said collimating mirror to said angular mirror and from the angular mirror to said reticle being equal to the focal length of said collimating mirror whereby the pivoting of said gimbal ring in azimuth with respect to said gun due to a movement of the latter causes the image of said reticle to produce an angular movement in the line of sight smaller than the angular movement of the gun bore.

6. An optical gun sighting device comprising, a gimbal ring having an upwardly extending bifurcated portion mounted on a gun to pivot about an azimuth axis with respect to said gun and to move in unison with said gun in elevation, a transparent reflector through which a target may be observed pivoted on the bifurcated portion of said gimbal on an elevation axis at right angles to said azimuth axis, a gyroscope having its spin axis parallel to the bore of said gun when said gun and said sighting device are at rest pivotally mounted on said gimbal ring on an axis parallel to the axis of said reflector, precessing force means for restoring said gyroscope to a position with the spin axis parallel to said gun bore following a displacement therefrom by the movement of said gun, an optical system for producing a virtual image of a reticle in the field of view of an observer by reflecting an image of said reticle onto said transparent reflector member to generate a line of sight, said system comprising a reticle and a source of light for producing an image thereof mounted on said gun, a mirror mounted on said gimbal for reflecting said image at an angle with the original direction thereof onto a collimating mirror fixedly mounted on said gun, and a negative lens mounted on said gimbal between said mirror and said collimating mirror, said negative lens forming a virtual image of said reticle on the focal plane of said collimating mirror whereby the pivoting of said gimbal ring with respect to said gun due to a movement of the latter in azimuth causes the sighting device to produce an angular change in the line of sight which is smaller than the angular change of the gun bore, and a linkage joining said reflector and said gyroscope whereby pivoting said gun in elevation causes said reflector to pivot through an angle equal to less than half of the angle through which said gyroscope pivots with respect to said gimbal, said line of sight thereby making a smaller angular change than the angular change of said gun in elevation.

7. An optical gun sighting device comprising a gimbal ring having an upwardly extending bifurcated portion pivotally mounted on a gun to pivot in azimuth with respect thereto, a transparent reflector through which a target may be observed mounted on the bifurcated portion of said gimbal ring, a gyroscope having its spin axis parallel to the bore of said gun when said gun is at rest mounted on said gimbal ring, means for applying a precessing force for restoring the spin axis of said gyroscope to parallelism with said gun bore following a displacement therefrom by a movement of said gun, and an optical system for producing a virtual image of a reticle in the field of view of an observer by reflecting an image of said reticle onto said transparent reflector which reflects it to form a line of sight, said system comprising a reticle and a source of light for producing an image thereof mounted on said gun, a mirror mounted on said gimbal ring for reflecting said image at an angle to the original direction thereof onto a collimating mirror supported on said gun, and a negative lens supported on said gun between said mirror and said collimating mirror, said negative lens forming a virtual image of said reticle on the focal plane of said collimating mirror, whereby the pivoting of said gimbal ring with respect to said gun due to a movement of the latter in azimuth causes the sighting device to produce an angular change in the line of sight smaller than the angular change of the gun bore.

8. An optical gun sighting device comprising a gimbal ring having an upwardly extending bifurcated portion pivotally mounted on a gun to pivot in azimuth with respect to said gun, a transparent reflector through which a target is observed mounted on the bifurcated portion of said gimbal ring, a gyroscope having its spin axis parallel to the bore of said gun when said gun is at rest mounted on said gimbal ring, means for applying a precessing force for restoring the spin axis of said gyroscope to parallelism with said gun bore following a displacement therefrom by a movement of said gun, and an optical system for producing a virtual image of a reticle in the field of view of an observer at an apparently infinite distance by reflecting an image of said reticle onto said transparent reflector in order to form a line of sight, said optical system comprising a reticle and a source of light for producing an image thereof mounted on said gun and a mirror mounted on said gimbal for reflecting said image at an angle to the original direction thereof onto a collimating mirror supported on said gun, said collimating mirror reflecting said image onto said transparent reflector, the sum of the distances from said collimating mirror to said angular mirror and from the latter to said reticle being approximately equal to the focal length of said collimating mirror, whereby the pivoting of said gimbal ring with respect to said gun due to a movement of the latter in azimuth causes said optical system to produce an angular movement in said line of sight smaller than the angular movement of said gun bore.

9. An optical gun sighting device comprising a gimbal ring having an upwardly extending bifurcated portion pivotally mounted on a gun to pivot in azimuth with respect to said gun, a transparent reflector through which a target may be observed mounted on the bifurcated portion of said gimbal ring, a gyroscope having its spin axis parallel to the bore of said gun when said gun is at rest mounted on said gimbal ring, means for applying a precessing force for restoring the spin axis of said gyroscope to parallelism with said gun bore following a displacement therefrom by a movement of said gun, and an optical system for forming a line of sight by producing a virtual image of a reticle in the field of view of an observer by reflecting an image of said reticle onto said transparent reflector, said optical system comprising a reticle and a source of light for producing an image thereof mounted on said gun, a mirror mounted on said gimbal for reflecting the image of said reticle in a direction at an angle from the original direction produced by said light source, a collimating mirror rigidly supported on said gun for reflecting the image from said mirror onto said transparent reflector, the angular reflection from said mirror producing a first component of motion of said reticle image in a direction opposite to a second component of motion thereof produced by a movement of said reflector only, whereby the pivoting of said gimbal ring with respect to said gun due to a movement of the latter in azimuth causes said gun sighting device to produce an angular movement in the line of sight smaller than the angular movement of the gun bore, the difference in said angular movements being responsive to the difference between said components, and a negative lens between said mirror and said collimating mirror for reducing the magnitude of said first component in order to increase said difference.

10. An optical gun sighting device comprising a gimbal ring having an upwardly extending bifurcated portion pivotally mounted on a gun to pivot in azimuth with respect to said gun, a sight glass through which a target may be observed mounted on the bifurcated portion of said gimbal ring, a gyroscope having its spin axis parallel to the bore of said gun when said gun is at rest mounted on said gimbal ring, means for applying a precessing force for restoring the spin axis of said gyroscope to parallelism with said gun bore following a displacement therefrom by a movement of said gun, and an optical system for producing a virtual image of a reticle in the field of view of an observer by reflecting an image of said reticle onto said sight glass to form a line of sight, said optical system comprising a reticle and a source of light for producing an image thereof mounted on said gun, a reflector mounted on said gimbal for reflecting the image of said reticle at an angle to the original direction of the light rays forming said image, and a collimating reflector rigidly supported on said gun for reflecting the image from said reflector onto said sight glass, the sum of the distances from said collimating reflector to said reflector and from the reflector to said reticle being approximately equal to the focal length of said collimating reflector, the pivoting of said gimbal ring causing the angular reflection of said reflector to produce a first component of motion of said reticle image in a direction opposite to a second component produced by a movement of said sight glass alone whereby the pivoting of said gimbal ring with respect to said gun due to a movement of the latter in azimuth causes said gun sighting device to produce an angular movement in the line of sight smaller than the angular movement of the gun bore, the difference in said angular movements being responsive to the magnitude of said first component.

References Cited in the file of this patent

UNITED STATES PATENTS

| | | |
|---|---|---|
| 2,313,204 | Morrelle | Mar. 9, 1943 |
| 2,391,357 | Sperry | Dec. 18, 1945 |
| 2,467,831 | Johnson | Apr. 19, 1949 |
| 2,490,747 | Creighton | Dec. 6, 1949 |

FOREIGN PATENTS

| | | |
|---|---|---|
| 751,309 | France | June 19, 1933 |